(12) United States Patent
Roquemore, III et al.

(10) Patent No.: US 7,389,932 B1
(45) Date of Patent: Jun. 24, 2008

(54) BARCODE SCANNER WITH TOOL FREE TOWER HOUSING ASSEMBLY

(75) Inventors: John P. Roquemore, III, Snellville, GA (US); John R. Johnson, Buford, GA (US)

(73) Assignee: NCR Corporation, Dayton, OH (US)

( * ) Notice: Subject to any disclaimer, the term of this patent is extended or adjusted under 35 U.S.C. 154(b) by 7 days.

(21) Appl. No.: 11/533,066

(22) Filed: Sep. 19, 2006

(51) Int. Cl.
*G06K 7/10* (2006.01)
(52) U.S. Cl. .............................. 235/462.43; 235/462.14; 235/462.47
(58) Field of Classification Search ............ 235/462.43, 235/462.14, 462.47
See application file for complete search history.

(56) References Cited

U.S. PATENT DOCUMENTS

| | | | | |
|---|---|---|---|---|
| 5,140,141 A | * | 8/1992 | Inagaki et al. | 235/462.43 |
| 5,406,063 A | * | 4/1995 | Jelen | 235/462.46 |
| 6,065,676 A | * | 5/2000 | Ring et al. | 235/462.43 |
| 6,216,951 B1 | * | 4/2001 | Swift et al. | 235/462.45 |
| 6,595,421 B2 | * | 7/2003 | Detwiler | 235/462.14 |
| 6,783,072 B2 | * | 8/2004 | Acosta et al. | 235/462.13 |
| 6,899,274 B2 | * | 5/2005 | Kumagai et al. | 235/472.01 |

* cited by examiner

*Primary Examiner*—Steven S Paik
*Assistant Examiner*—Tuyen K Vo
(74) *Attorney, Agent, or Firm*—Paul W. Martin

(57) ABSTRACT

A barcode scanner with a tool free tower housing assembly. The barcode scanner includes a base, a tower section coupled to the base, and a tower housing assembly over the tower section including a tower housing and a bezel that are installable and removable without hand tools.

2 Claims, 9 Drawing Sheets

BARCODE SCANNER WITH TOOL FREE TOWER HOUSING ASSEMBLY

BACKGROUND

Dual-aperture scanners have a tower that extends above a checkstand. The tower includes elements that may periodically require servicing, such as buttons, speakers, and light emitting diodes. Additionally, this space may be used to contain other serviceable components, such as an electronic article surveillance antenna, a radio frequency identification antenna, and other electronics.

Tower housings must be sturdy enough to allow gripping during carrying, installation, and removal of scanners from checkstands. Typical tower housings are fastened with screws for structural support. However, fasteners make servicing of components with the tower housing more difficult.

It would be desirable to provide a tower housing assembly which does not require tools to install or remove so that technicians may more easily service components within the tower housing assembly.

SUMMARY

A barcode scanner with a tool free tower housing assembly is provided.

The barcode scanner includes a base, a tower section coupled to the base, and a tower housing assembly over the tower section including a tower housing and a bezel that are installable and removable without hand tools.

DETAILED DESCRIPTION

Figure 1:
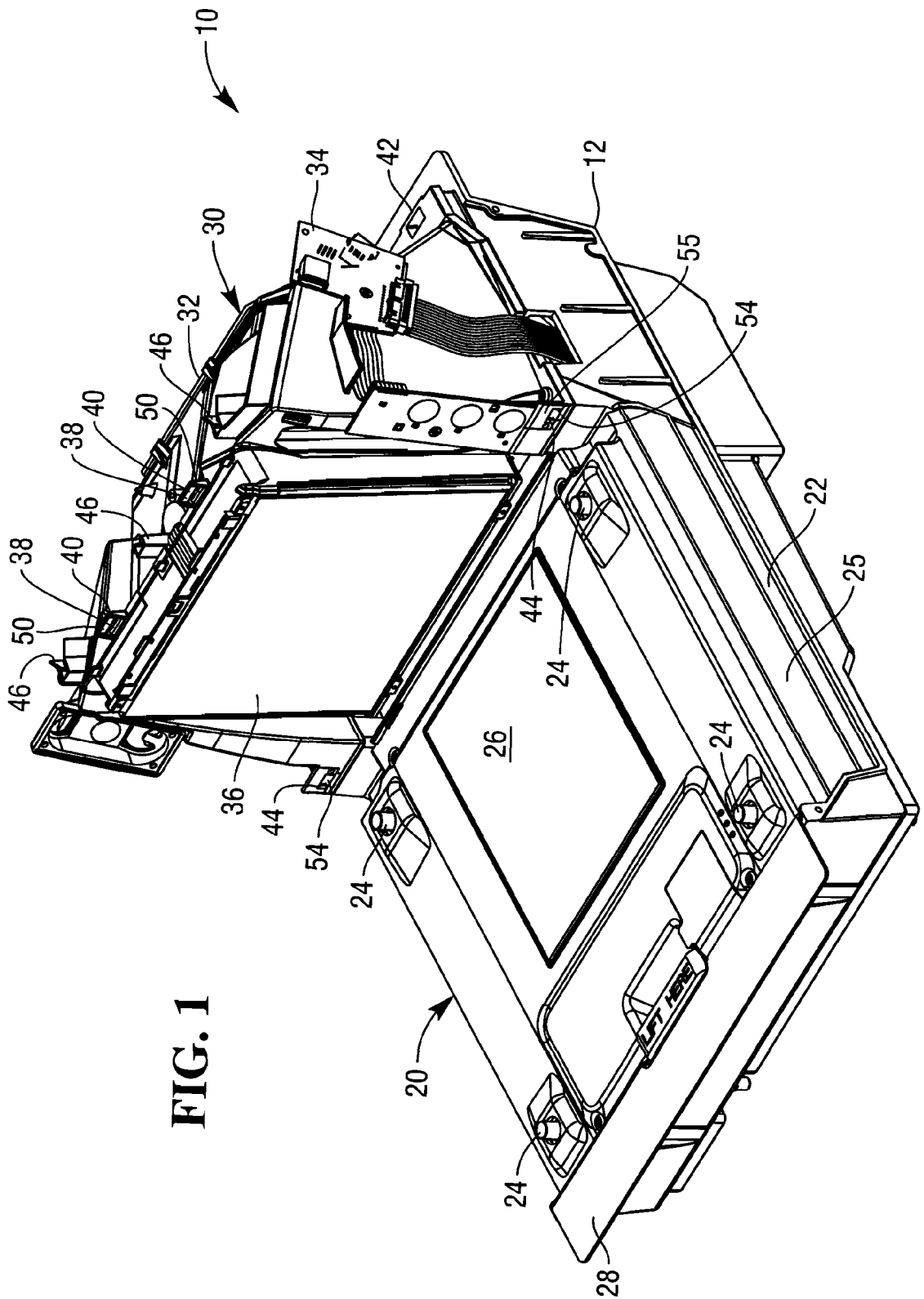
FIG. 1 is a perspective view of an optical scanner with the tower housing assembly removed.
Figure 2:
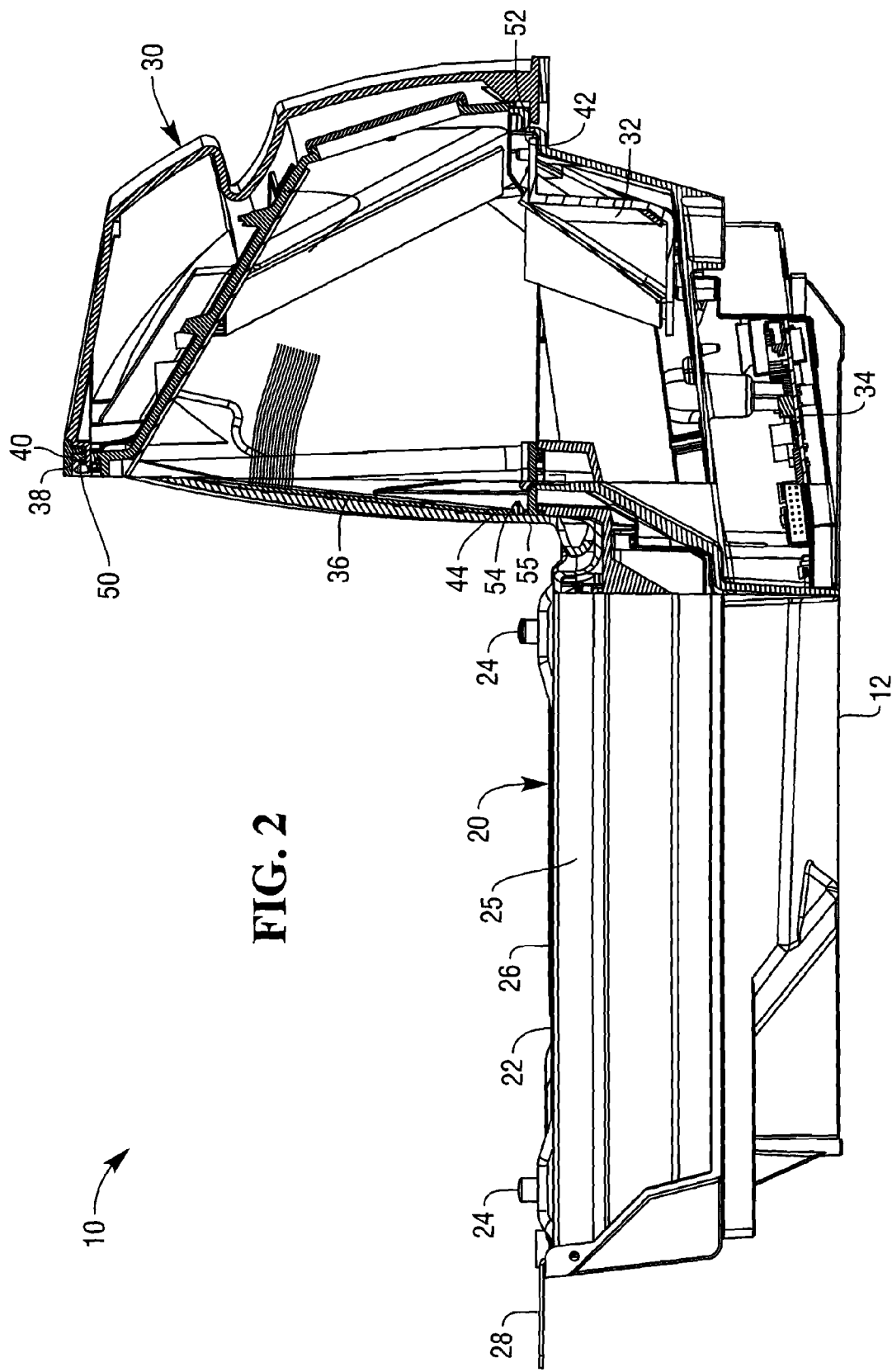
FIG. 2 is a cross-sectional view of the optical scanner of FIG. 1.

With reference to FIGS. 1 and 2, optical scanner 10 includes base 12, which provides a foundation for other components of optical scanner 10. Base 12 may be made of metal. Front lip 28 serves to support scanner 10 in a checkout counter.

Optical scanner 10 includes a horizontal section 20, which includes mirror housing 22, scales 24, and debris guard 25.

Mirror housing 22 contains a first set of pattern mirrors for generating a first set of scan lines. Mirror housing 22 further includes window 26 through which the first set of scan lines pass for scanning an item from a first plurality of directions.

Scales 24 serve to weigh produce items. In a fully assembled state, optical scanner 10 further includes a frame that ties scales 24 together and provides support pins for a weigh plate with an aperture similar to window 26.

Debris guard 25 catches debris that falls from products.

Optical scanner 10 further includes a vertical or tower section 30, which includes mirror housing 32 and electronics 34.

Mirror housing 32 contains a second set of pattern mirrors for generating a second set of scan lines. Mirror housing 32 further includes window 36 through which the second set of scan lines pass for scanning the item from a second plurality of directions.

In order to support installation of tower housing 60 (FIG. 3), mirror housing 32 includes attachment points 40, 42, and 44. Attachment points 40 are located on top of mirror housing 32, behind window 36, and include attachment posts 38 with apertures 50. Attachment point 42 is located along the bottom rear edge of mirror housing 32 and includes a channel 52 formed in base 12. Attachment points 44 are located on front left and right sides of mirror housing 32 and include apertures 54 in the front wall 55 of tower section 30.

Mirror housing 32 further includes limit points 46 which provide a limit of forward movement of tower housing 60 during installation and support housing 60 after installation. Limit points 46 are illustrated as raised wall or post features on top of mirror housing 32.

Electronics 34 includes control circuitry for controlling operation of one or more lasers and motors and for decoding barcode information, scale electronics, and operator instrumentation and controls. Electronics 34 may also include peripherals combined into optical scanner 10, such as electronic article surveillance systems and radio frequency identification systems.

Figure 3A:
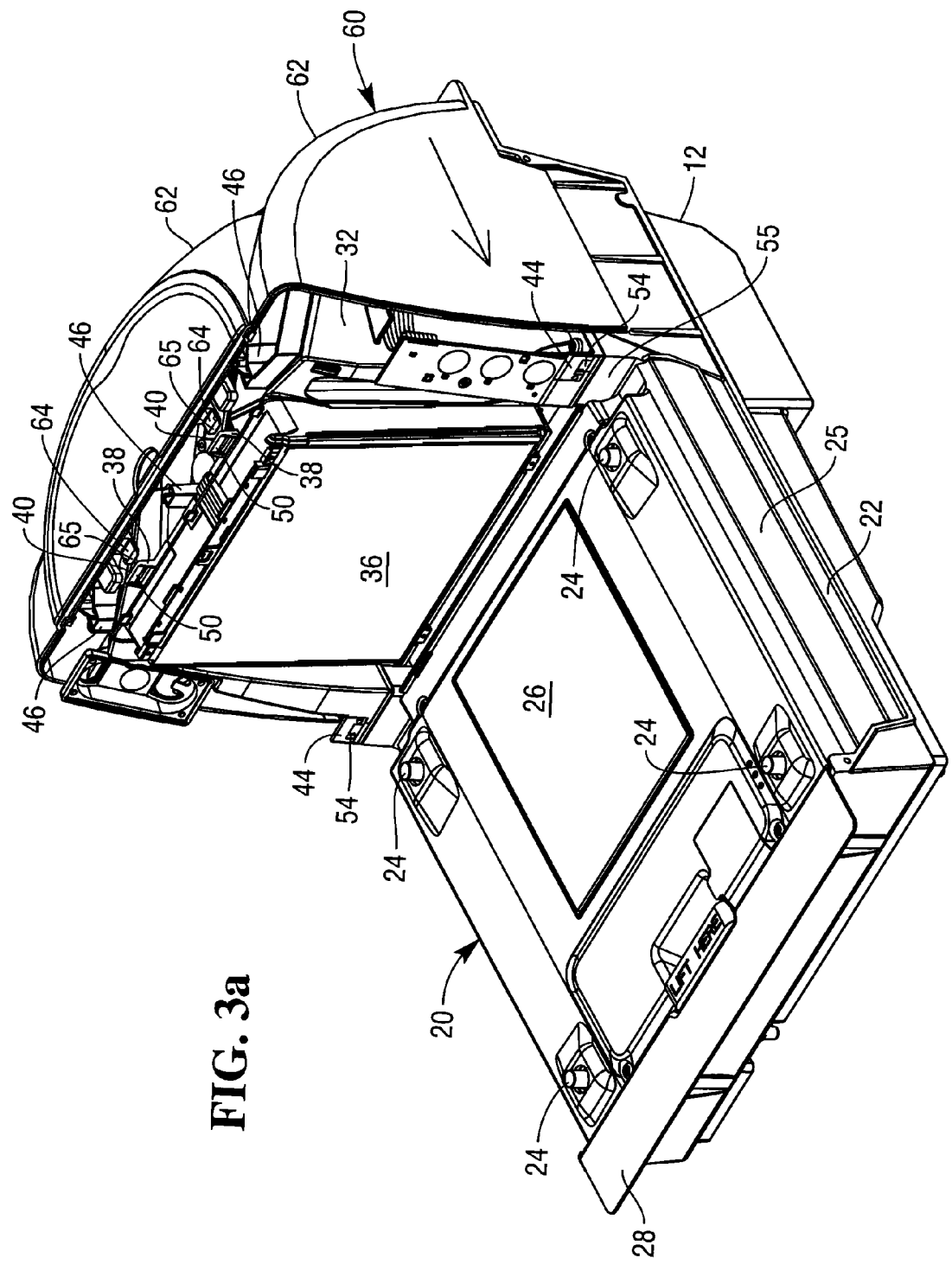
FIGS. 3a and 3b are perspective views illustrating installation of a tower housing.
Figure 3B:
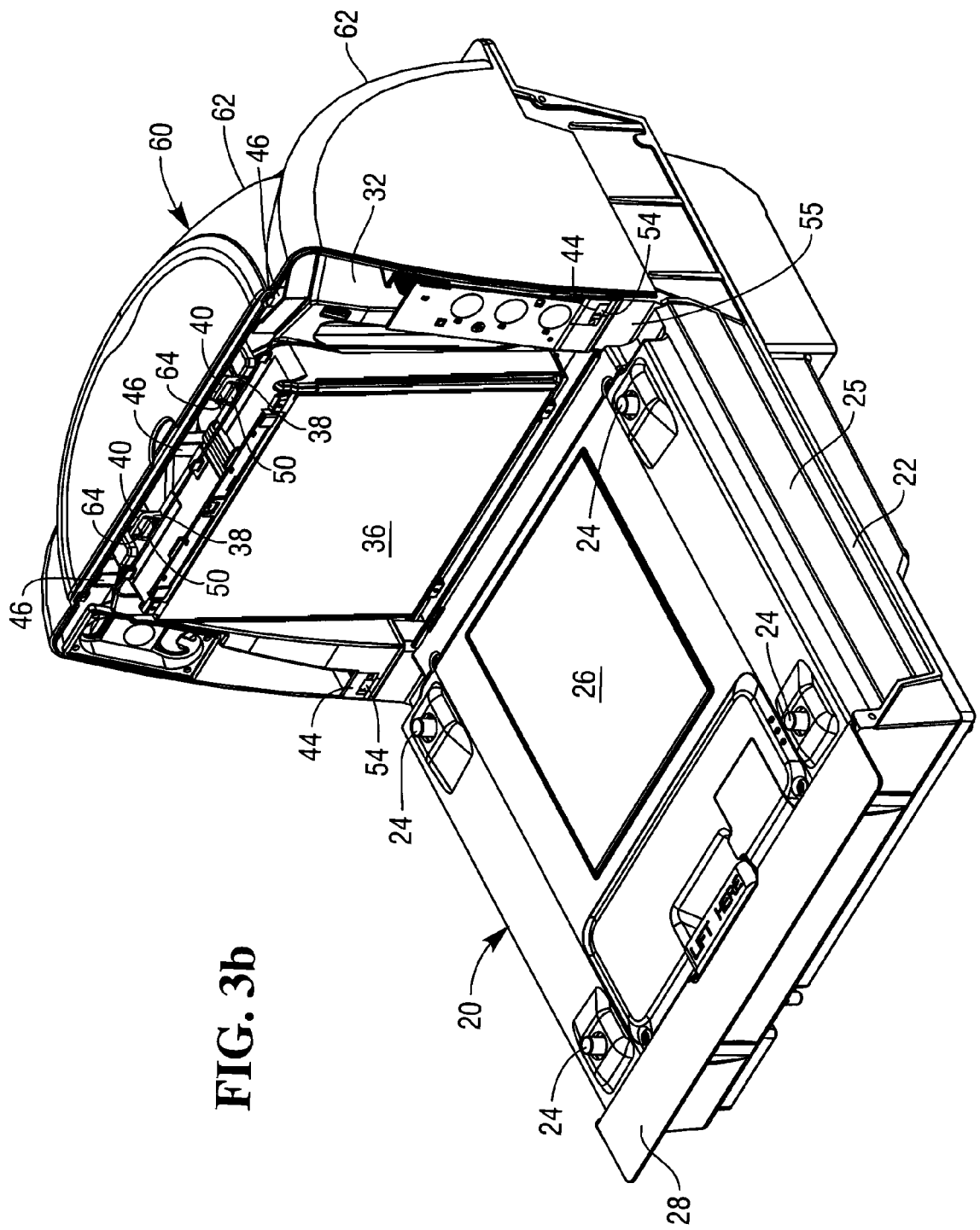
Figure 4:
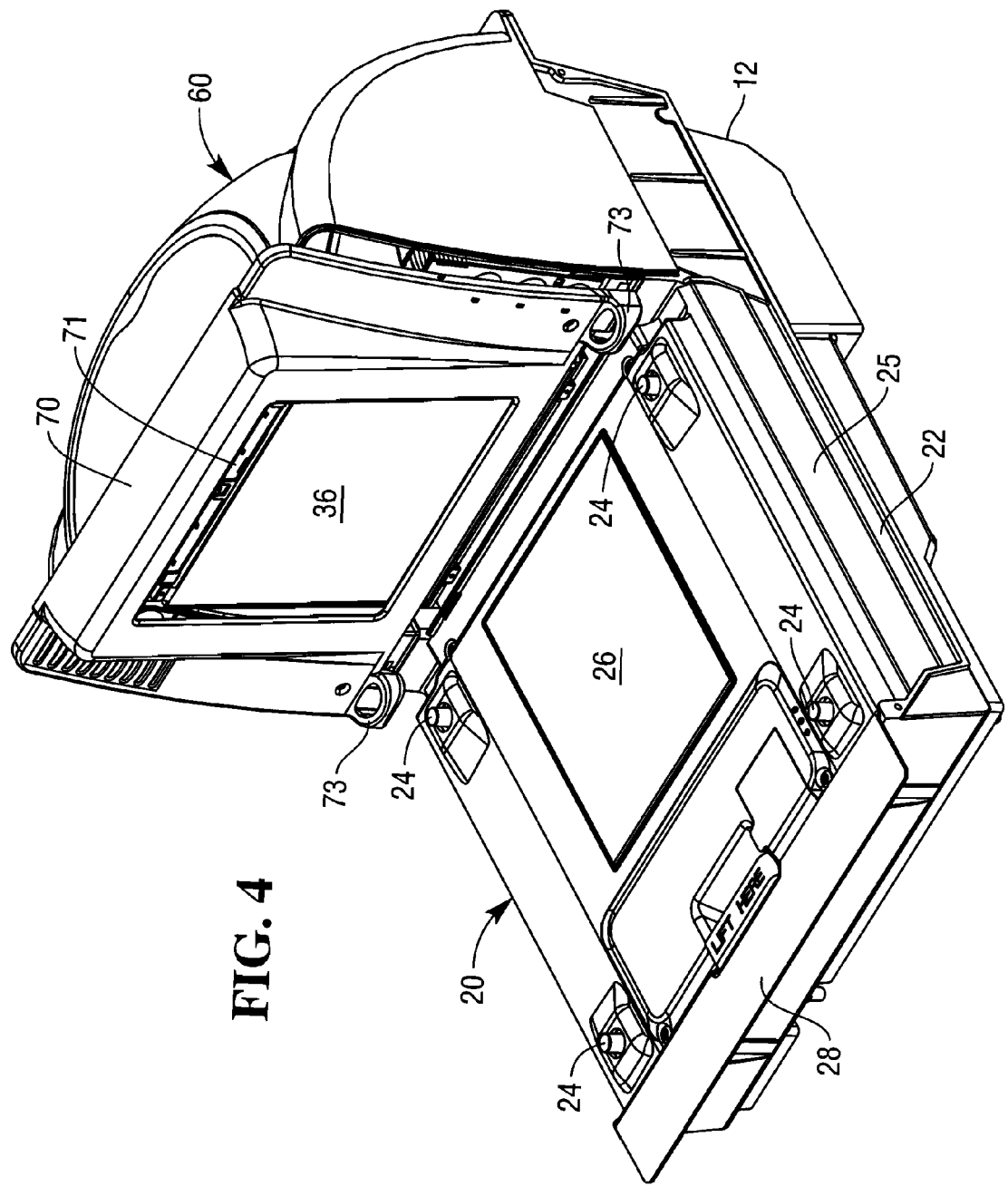
FIG. 4 is a perspective views illustrating installation of a bezel.

With reference to FIGS. 3a-b, installation of tower housing 60 is illustrated.

Tower housing 60 generally conforms to the shape of mirror housing 32 and includes handle grips 62 on its rear surface for carrying, installing, and removing scanner 10 from a checkout counter.

Figure 5:
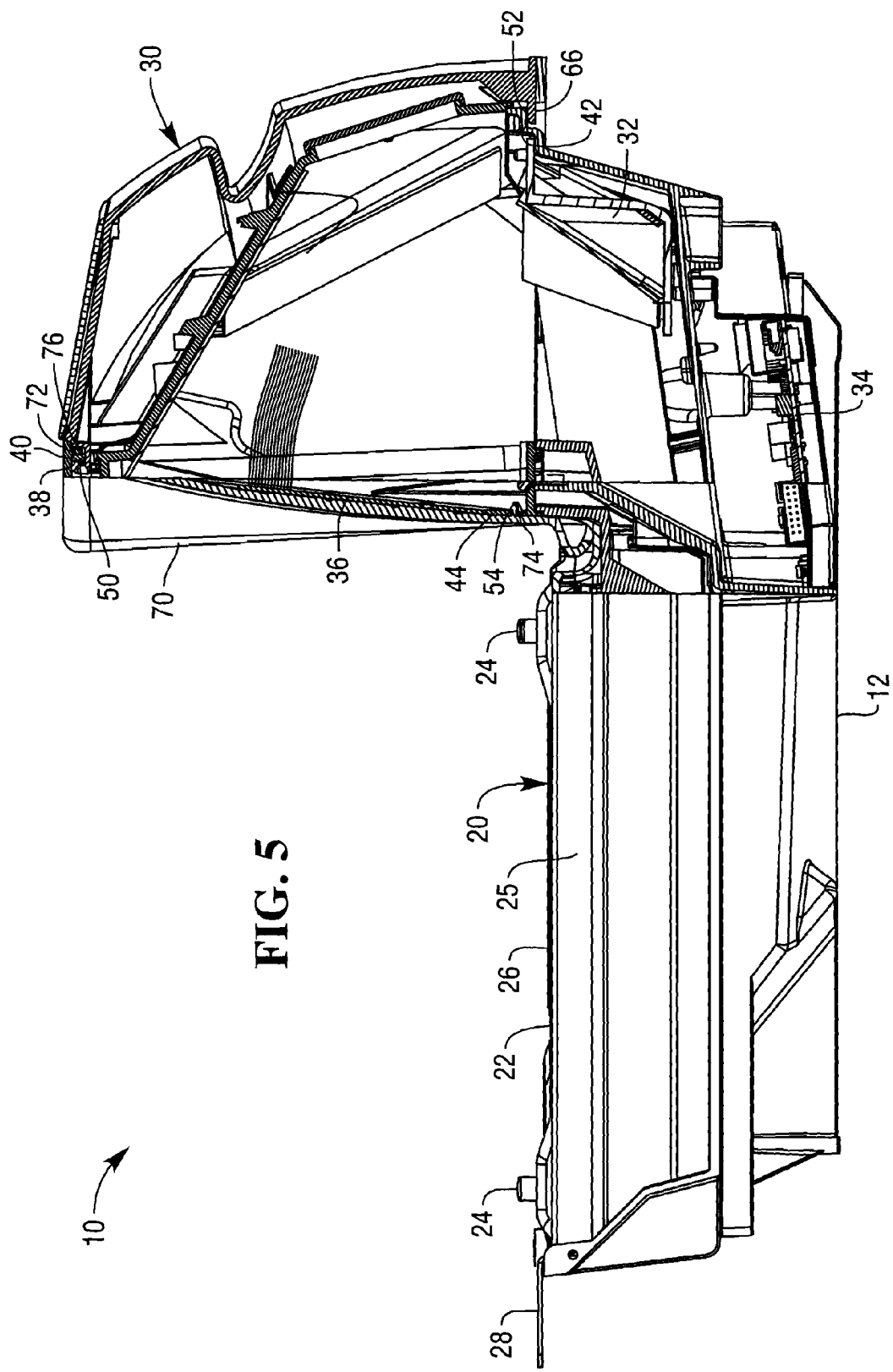
FIG. 5 is a cross-sectional view illustrating installation of the tower housing and a tower bezel.
Figure 6:
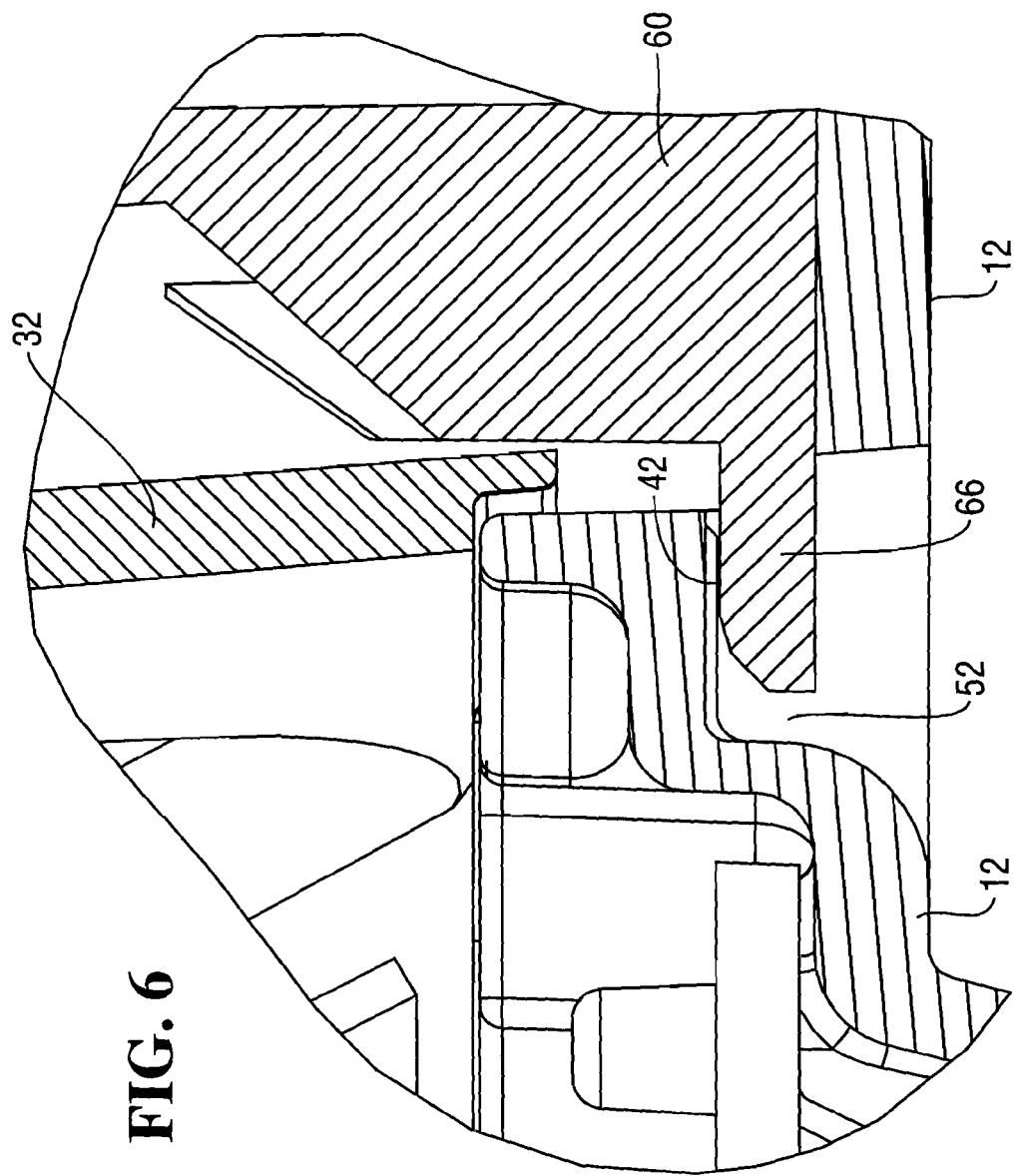
FIG. 6 is a first detailed view illustrating attachment of the tower housing.
Figure 7:
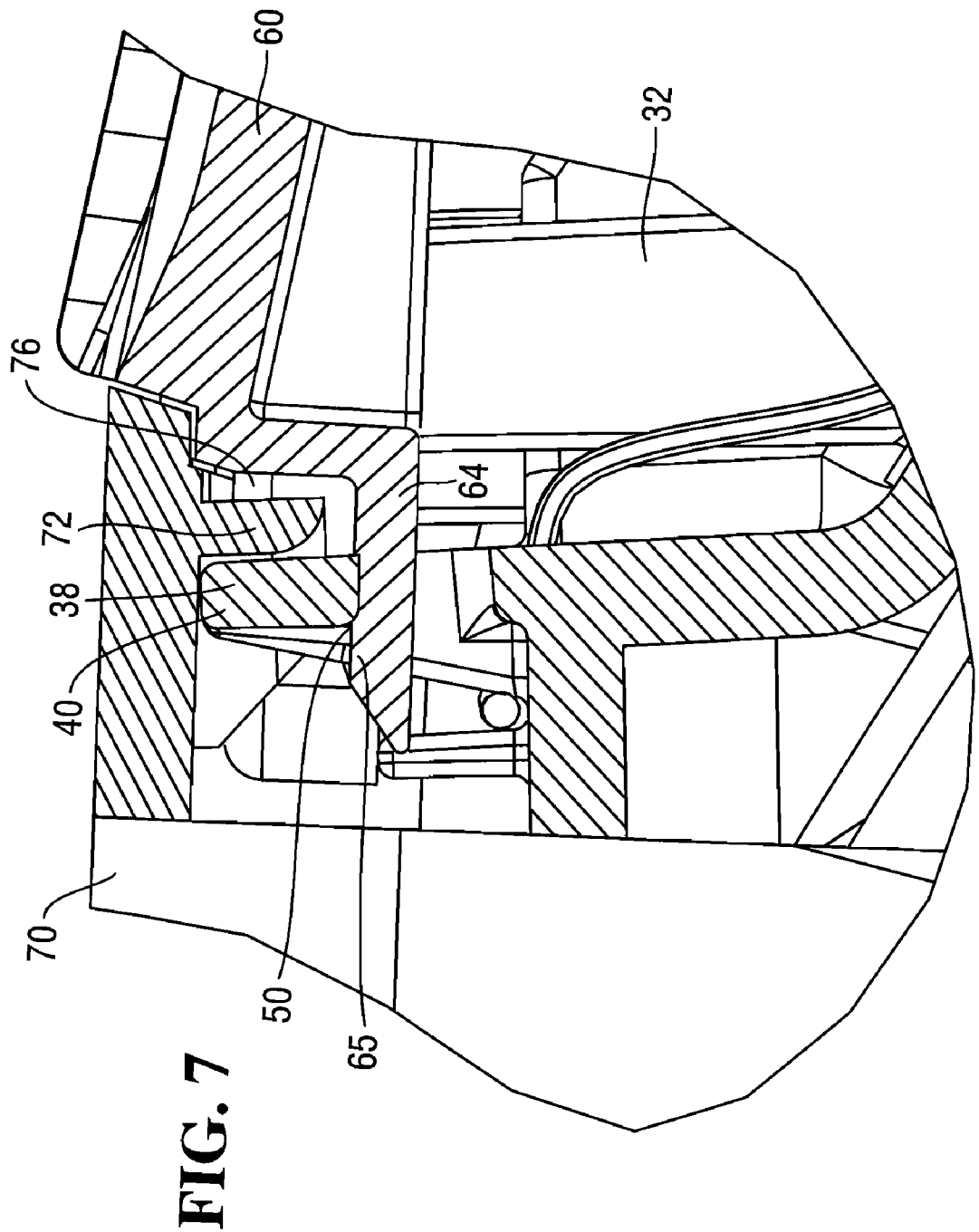
FIG. 7 is a second detailed view illustrating attachment of the tower housing and the bezel.
Figure 8:
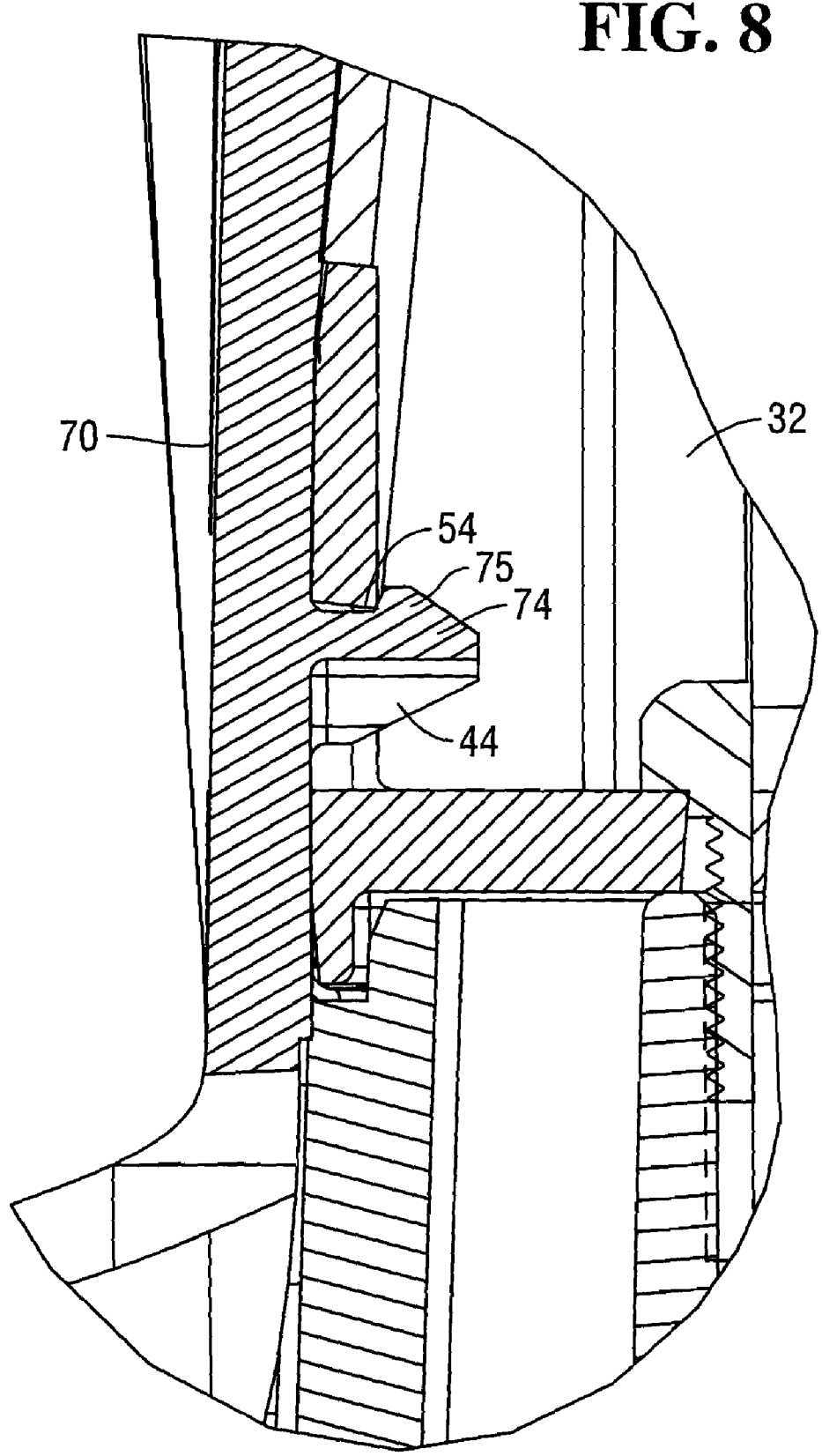
FIG. 8 is a third detailed view illustrating attachment of the bezel.

Tower housing 60 includes flanges 64 which engage attachment points 40 through apertures 50 during installation. Flanges 64 include detents 65 which retain flanges 64 within apertures 50. Tower housing 60 further includes lip 66 (FIG. 5) which engages attachment point 42 by seating in channel 52 during installation.

To begin the installation, tower housing 60 is aligned on base 12 behind mirror housing 32. Tower housing 60 is then slid horizontally towards mirror housing 32 until flanges 64 engage attachment posts 38 and lip 66 seats in channel 52. Flanges 64 are depressed slightly away from a normal bias position in order to allow detents 65 to pass through apertures 50. Limit points 46 engage tower housing 60 to provide opposing snap force on flanges 64.

Together, attachment points 40 and 42 retain tower housing 60 in place, even during lifting of scanner 10, without requiring separate fasteners, such as screws.

Removal of tower housing 60 begins with depressing of flanges 64 to unseat detents 65 from attachment posts 38. Tower housing 60 is then slid horizontally rearward until lip 66 is clear of channel 52.

With reference to FIG. 4-8, attachment points 40, 42, and 44 are shown in more detail, as well as installation of bezel 70.

Bezel 70 includes aperture 71 which is about the size of window 36. Bezel 70 further includes upper flanges 72 and lower flanges 74. (FIG. 5) Upper flange 72 seats within a recess 76 formed between attachment post 38 and tower housing 60. Limit points 46 help maintain recess 76.

Lower flanges 74 seat within apertures 54 of attachment points 44. Lower flanges 74 include detents 75 which retain flanges 74 within apertures 54.

Installation of bezel 72 includes first positioning bezel 70 in front of window 36 and then lowering bezel 70 to engage flanges 72 within recesses 76. After flanges 72 are located within recesses 76, pressure is applied to the lower left and right sides of bezel 70 to seat flanges 74 within apertures 54. Flanges 74 bend slightly away from a normal bias position in order to allow detents 75 to pass through apertures 54.

Removal proceeds in opposite fashion by first pulling bezel 70 away from tower housing 60 to using pull features 73 to release flanges 74 from attachment points 44, and then raising bezel 70 to remove flanges 72 from recesses 76.

Although particular reference has been made to certain embodiments, variations and modifications are also envisioned within the spirit and scope of the following claims.

What is claimed is:

1. A dual-aperture barcode scanner comprising:
   a base section including a channel;
   a tower section on the base section including
      a substantially vertical window on a first side;
      a top attachment post containing a first aperture;
      a limit point; and
      a front attachment wall containing a second aperture;
   a tower housing slidably installed over the tower section from a second side of the tower section opposite the first side including
      a hand grip;
      a flange which engages the attachment post through the first aperture;
      a lip which engages the channel to support lifting of the scanner from the hand grip;
   wherein the limit point limits movement of the tower housing during installation, supports the tower housing after the installation, and establishes a recess between the tower housing and the top attachment post; and
   a bezel installed over the tower section from the first side including
      a third aperture about equal in size to the substantially vertical window;
      an upper flange which seats in the recess; and
      a lower flange which engages the front attachment wall through the second aperture;
   wherein the cover and the bezel are installable and removable without hand tools.

2. A dual-aperture barcode scanner comprising:
   a base section including a channel;
   a first mirror housing in the base section including a substantially horizontal window and containing a first set of pattern mirrors for sending a first set of scanning beams through the substantially horizontal window;
   a second mirror housing rising from the base section including a substantially vertical window on a first side and containing a second set of pattern mirrors for sending a second set of scanning beams through the substantially vertical window;
   wherein the second mirror housing further includes
      a top attachment post containing a first aperture;
      a limit point; and
      a front attachment wall containing a second aperture;
   a cover for the second mirror housing slidably installed from a second side of the second mirror housing opposite the first side including
      a hand grip;
      a flange which engages the attachment post through the first aperture;
      a lip which engages the channel to support lifting of the scanner from the hand grip;
   wherein the limit point limits movement of the cover during installation, supports that cover after the installation, and establishes a recess between the cover and the top attachment post; and
   a bezel for the second mirror housing installed from the first side of the second mirror housing including
      a third aperture about equal in size to the substantially vertical window;
      an upper flange which seats in the recess; and
      a lower flange which engages the front attachment wall through the second aperture;
   wherein the cover and the bezel are installable and removable without hand tools.

* * * * *